Feb. 5, 1935.	H. H. BEVERAGE	1,989,965
METHOD OF TESTING RECORDED SOUND
Filed Aug. 5, 1931	3 Sheets-Sheet 1
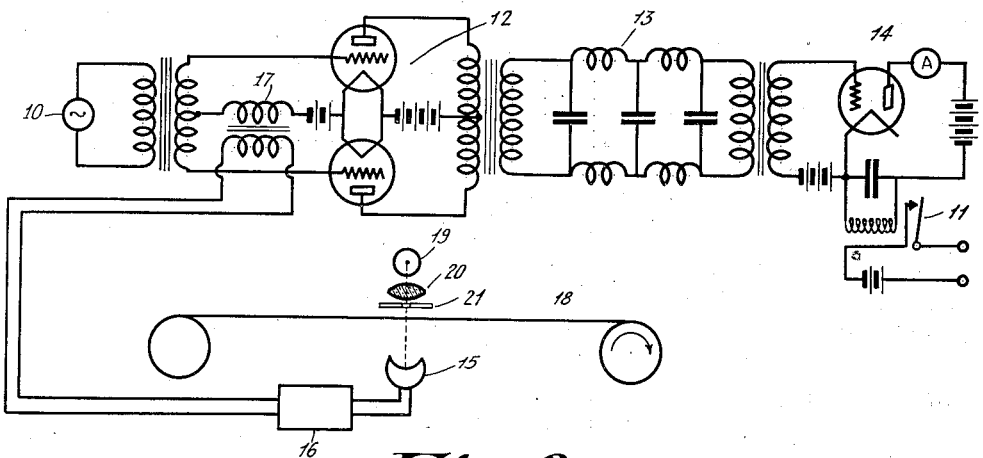
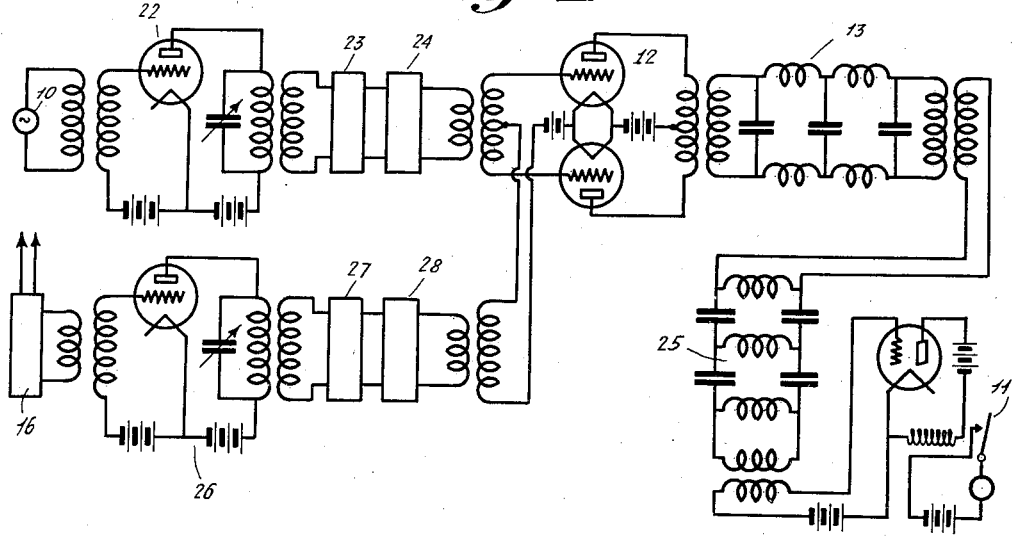
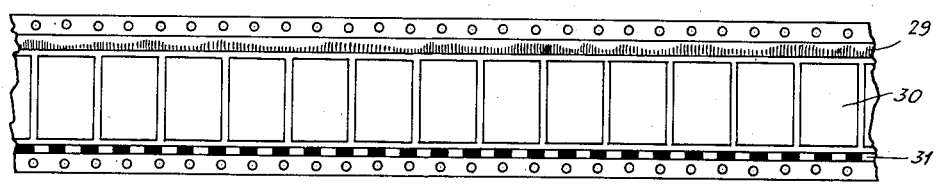
INVENTOR
HAROLD H. BEVERAGE
BY
ATTORNEY Feb. 5, 1935.   H. H. BEVERAGE   1,989,965
METHOD OF TESTING RECORDED SOUND
Filed Aug. 5, 1931   3 Sheets-Sheet 2
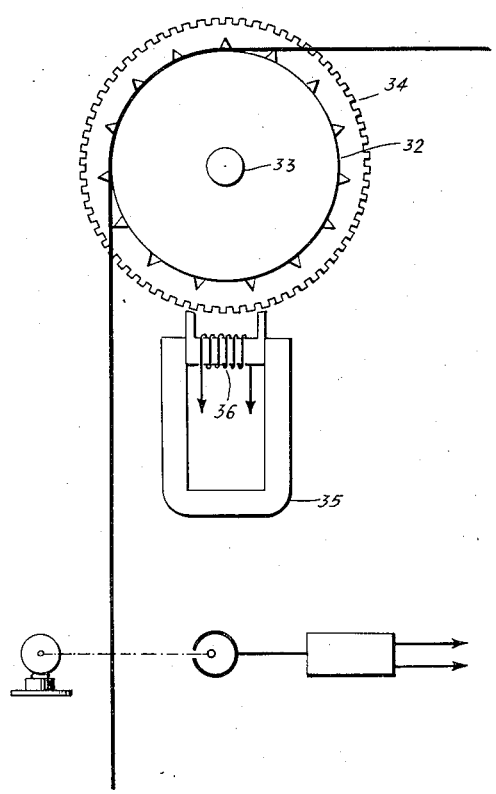
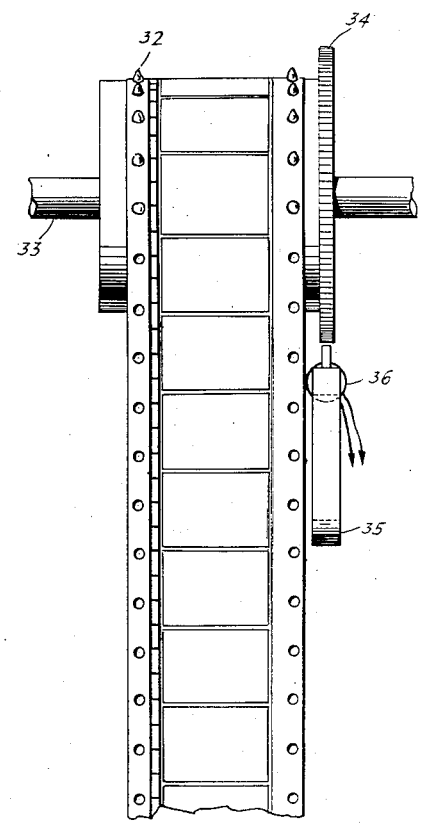
INVENTOR
HAROLD H. BEVERAGE
BY
ATTORNEY Feb. 5, 1935.  H. H. BEVERAGE  1,989,965
METHOD OF TESTING RECORDED SOUND
Filed Aug. 5, 1931   3 Sheets-Sheet 3
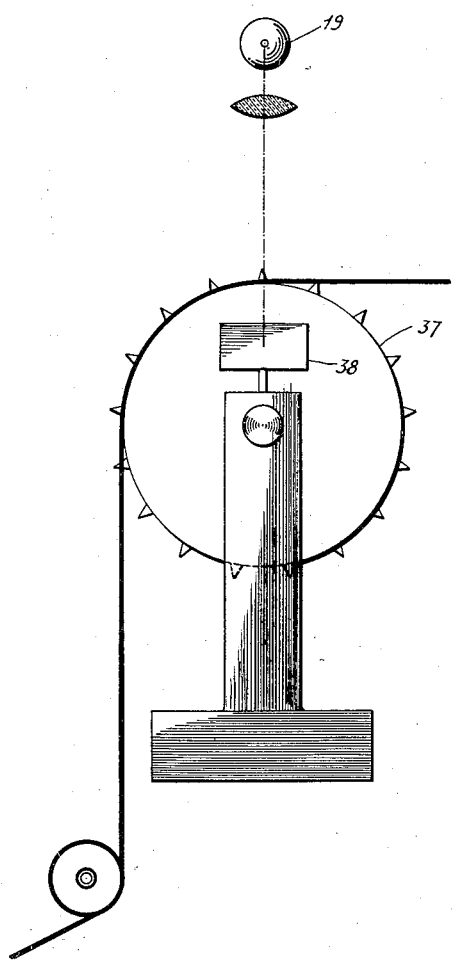
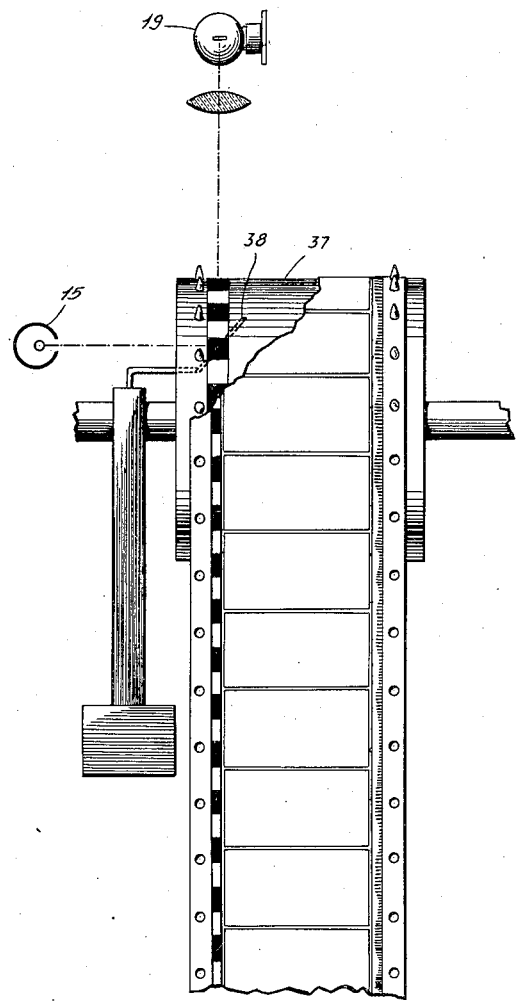
INVENTOR
HAROLD H. BEVERAGE
BY
ATTORNEY

UNITED STATES PATENT OFFICE 1,989,965

METHOD OF TESTING RECORDED SOUND

Harold H. Beverage, Riverhead, N. Y., assignor to Radio Corporation of America, a corporation of Delaware Application August 5, 1931, Serial No. 555,273

11 Claims. (Cl. 179—100.3)

My invention relates to the testing of sound records such as are utilized in conjunction with moving pictures, and has for its principal object the provision of an improved method and apparatus for determining the characteristics of such records. While my invention is described as applied to photographic records of sound, it will be apparent to those skilled in the art that it is not limited to sound records of this type but may be utilized with various types of records.

In the photographic recording of sound great care is taken to see that the light on the recorder film is perfectly uniform, that the film is moved through the recorder at a very constant speed, and is thereafter developed with great exactness. As is well known, the slightest irregularity in the recording speed of the film gives rise to a variation in frequency which produces disagreeable noise in the reproduced sound, and carelessness in the development of the film may entirely destroy the artistic effect which it is desired to produce. Great care is therefore exercised in the recording and development of the sound record.

After the original film has been carefully prepared master films are made from it and from these master films are produced great numbers of prints which are the films ordinarily used in the projection of sound pictures. During the process of making these prints trouble is encountered due to slight irregular slipping of the print with respect to the master film. This slipping produces variation in the frequency of the sound recorded on the print and as a result it is customary to run each print through a projector for monitoring purposes before it is released to the theater. Obviously, this is a great inconvenience because the prints are made in vast quantities for release at many points simultaneously.

In accordance with my invention, this long and expensive process of checking each film individually is obviated by a method and apparatus whereby an impulse of a frequency proportional to the recording speed of the sound is compared with a constant frequency impulse either during the testing of the sound record or during its reproduction. It will be apparent that this record may be made either at the side of the film opposite to that of the sound record or on any other suitable part of the film. If it is of sub-audible or super-audible frequency it may of course be made on the same part of the film as the sound track which is to be reproduced.

In putting my invention into effect I propose to have available at the recording studio a substantially constant frequency source. This constant frequency is preferably derived from a suitable generator mounted on a sprocket shaft of the recorder although this particular arrangement is not essential to the practice of my invention. The constant frequency note derived from this source is recorded on an auxiliary sound track. This auxiliary sound track is developed along with the regular sound track and appears on the master film which will ordinarily bear the regular sound track, the picture record and the auxiliary sound track. The master film having been checked and found to be satisfactory, is then used for making prints for delivery to the theater. The problem to which my invention is particularly directed is the checking of these prints as clearly and cheaply as possible, to see that they do not have any variation in frequency due to slippage of the film during the printing operation. Instead of checking the sound from the regular sound track in the customary way, I propose to run these prints through a suitable device which will produce electrical impulses dependent on the tone recorded on the auxiliary sound track. If the film is moved at exactly the same speed as that used in recording, these impulses should correspond exactly with those originally recorded on the auxiliary record. If any variation occurs due to inaccuracy in the printing process it will result in a variable frequency which can be detected by comparison with a constant frequency. Any suitable means may be utilized to render visible or audible change in the relation between the two frequencies.

My invention will be better understood from the following description when considered in connection with the accompanying drawings, and its scope will be pointed out in the appended claims.

Referring to the drawings;

Fig. 1 illustrates diagrammatically a test apparatus embodying my invention.

Fig. 2 illustrates a modified embodiment which includes harmonic amplifiers for stepping up the frequency of the impulses to be compared and otherwise differs from Fig. 1 in certain details.

Fig. 3 illustrates a form of sound picture film, and

Figs. 4 to 7 illustrate different types of means for producing the impulses recorded on the auxiliary sound track.

The apparatus illustrated by Fig. 1 includes a constant frequency source 10 which is connected to an aural or visual indicating device 11 through a detector 12, a low pass filter 13 and a bias rectifier 14. Impulses of a frequency dependent on the characteristics of the auxiliary sound track are supplied from a photocell 15 through an amplifier 16 and a transformer 17, to the circuit of the detector 12. These impulses are produced by the auxiliary record of a film 18, light from a source 19 being projected to the photo-cell through a lens 20, an aperture plate 21, and the auxiliary sound track. As will be apparent, the purpose of the low pass filter is to eliminate harmonics of the impulses supplied to the indicator 11.

In the operation of the apparatus constant frequency impulses are supplied to the detector 12 from the source 10, and impulses of a frequency dependent on the characteristics of the auxiliary sound track of the film 18 are also supplied to this detector. So long as these two sets of impulses correspond, no beat note is produced and the indicator 11 is not actuated. If the impulses supplied from the photo-cell 15 vary in frequency however, a beat note is produced and an indication of the defectiveness of the sound record is immediately produced.

In cases where a limited range of variation in the characteristics of the auxiliary record are permissible, means may be provided to permit any desired degree of precision or tolerance. For example, harmonic generators may be used to step up the frequencies of the standard and derived frequency impulses. If the hundredth harmonics of these impulses are utilized, the sensitivity of the apparatus is increased one hundredfold. If it is desired to allow some variation in the frequency recorded on the film, this tolerance may be provided for automatically by including in the circuit a high pass filter which will transmit the beat frequency when it reaches a pre-determined value. The amount of allowable variation will of course be dependent on that required to disturb the ear.

The apparatus illustrated by Fig. 2 differs from that of Fig. 1 in that the standard or constant frequency impulses are applied to the indicator 11 through a harmonic generator 22, a harmonic filter 23, an amplifier 24, and a high pass filter 25, the design of which is determined by the permissible degree of tolerance in variation of the impulses produced by the auxiliary record. The auxiliary record impulses which are combined with the constant frequency impulses in the detector 12, are supplied to this detector through a harmonic generator 26, a harmonic filter 27, and an amplifier 28. This modification of the invention has the advantage that sensitivity to frequency variation is increased and the degree of tolerance in this variation is readily determined.

The film illustrated by Fig. 3 comprises the usual sound track 29, the usual picture record 30, and the auxiliary sound track 31. The manner of its use will be readily understood in view of the foregoing explanation. It is obvious that in checking the auxiliary record against a standard frequency it is not essential that it be moved at the same speed as that at which it was recorded. All that is necessary is that it be moved at a speed corresponding to the frequency of the standard frequency source.

In order to avoid variation in the speed of the motor which drives the print during the testing operation, the standard frequency may be produced by a generator driven by the same shaft as the film driving sprocket. This arrangement has the advantage that the comparison between the frequency impulses is rendered independent of slight variations in the uniformity of the drive sprocket speed. It may assume various forms.

Figs. 4 and 5 illustrate a film driving sprocket 32 mounted on a shaft 33. Also mounted on this shaft is a toothed wheel 34 of soft iron or the like, and arranged to cooperate with this wheel are a magnet 35 and a coil 36. The wheel 34 should of course have a sufficient number of teeth to generate a frequency comparable with the frequency recorded on the auxiliary sound record. Obviously, an harmonic amplifier may be utilized as described in connection with Fig. 2, for multiplying the frequency of the toothed wheel generator. In the apparatus of Figs. 1 and 2 the toothed wheel generator is substituted for the constant frequency source 10. The operation of the apparatus as modified by the inclusion of the toothed wheel generator will be readily understood in view of the foregoing explanation. It will of course be understood that the toothed wheel may be made integral with the sprocket if desired.

Various other means may be associated with the sprocket for comparing the frequency impulses of the apparatus. In Figs. 6 and 7 a drum 37 is associated with the sprocket. This drum is blackened to make it opaque to light except for a narrow strip at a point just beneath the auxiliary sound track, and is provided with alternate opaque and transparent segments which exactly correspond to the frequency recorded on the auxiliary sound track. A beam of light from the lamp 19 is focussed on the auxiliary sound track and shines down through the film and the transparent segments onto a mirror 38 which reflects the beam to the photo-cell 15. The auxiliary record and the segments on the drum being of exactly the same frequency will line up and permit the transmission to the photo-cell of an amount of light depending on the phase relation between the auxiliary record and the drum segments. If there is any variation in the phase or the frequency recorded on the film, the phase relation between the auxiliary record and the drum segments will vary, thus changing the amount of light transmitted to the photo-cell. These changes in the photo-cell current may be amplified to give the visual or oral warning as previously explained. Other means of putting my invention into effect will readily occur to those skilled in the art.

Having thus described my invention and the operation thereof, what I claim is:

1. The method of testing a sound track recorded on a record medium which includes making an auxiliary record of a substantially constant frequency tone on said medium, driving said record at a uniform speed, and comparing said auxiliary record with a constant frequency impulse.

2. The method of testing a sound track recorded on a photographic medium which includes making an auxiliary record of a substantially constant frequency tone on said medium, driving said record at a uniform speed, and comparing said auxiliary record with a constant frequency impulse.

3. The method of testing a sound track recorded on a record medium which includes making an auxiliary record of a substantially constant frequency tone on said medium simultaneously with the recording of said track, driving said record at a uniform speed, and comparing said auxiliary record with a constant frequency impulse.

4. The method of testing a sound track recorded on a record medium which includes making an auxiliary record of a substantially constant frequency tone on said medium, driving said record at a uniform speed, reproducing said auxiliary record as electrical impulses, and comparing said impulses with a constant frequency impulse.

5. The method of testing a sound track recorded on a record medium which includes making an auxiliary record of a substantially constant frequency tone on said medium, driving said record at a uniform speed, reproducing said auxiliary record as electrical impulses, multiplying the frequency of said impulses, and comparing the impulses so multiplied with a constant frequency impulse.

6. The method of testing a sound track recorded on a record medium which includes making an auxiliary record at a speed dependent on the speed at which said sound track is recorded, driving said record at a uniform speed, and comparing said auxiliary record with a constant frequency impulse.

7. The method of testing a sound track recorded on a record medium which includes recording an auxiliary record on said medium at the same speed at which said track is recorded, driving said record at a uniform speed, reproducing said auxiliary record as current impulses, and comparing said impulses with a constant frequency impulse.

8. A sound film testing apparatus including means for producing impulses of constant frequency, means for driving said film at a uniform speed and producing impulses of a frequency dependent upon the speed at which said sound is recorded, and means for comparing said dependent impulses with said constant frequency impulses.

9. A sound film testing apparatus including means for producing constant frequency impulses, means for driving said film at a uniform speed and producing impulses of a frequency dependent on the recording speed of said sound, and means for producing a beat note dependent on the difference between the frequencies of said constant and dependent frequency impulses.

10. A sound film testing apparatus including means for producing constant frequency impulses, means for driving said film at a uniform speed and producing impulses of a frequency dependent on the recording speed of said sound, means for producing a beat note dependent on the difference between the frequencies of said constant and dependent frequency impulses, and low pass filter means arranged to obviate the harmonics of said combined impulses.

11. A sound film testing apparatus including means for producing constant frequency impulses, means for driving said film at a uniform speed and producing impulses of a frequency dependent on the recording speed of said sound, means for producing a beat note dependent on the difference between the frequencies of said constant and dependent frequency impulses, and means for transmitting said beat note only when it exceeds a pre-determined value.

HAROLD H. BEVERAGE.